(12) United States Patent
Tompkins et al.

(10) Patent No.: US 12,330,528 B2
(45) Date of Patent: Jun. 17, 2025

(54) CONTROL UNITS, SYSTEMS, AND VEHICLES FOR CONTROLLING OPERATIONS OF ON-BOARD EQUIPMENT

(71) Applicant: Rivian IP Holdings, LLC, Plymouth, MI (US)

(72) Inventors: Philip Tompkins, Irvine, CA (US); Alex Yang, Redwood City, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 265 days.

(21) Appl. No.: 17/684,757

(22) Filed: Mar. 2, 2022

(65) Prior Publication Data

US 2023/0278461 A1   Sep. 7, 2023

(51) Int. Cl.
*B60L 58/00* (2019.01)
*B60L 1/00* (2006.01)
*B60L 58/13* (2019.01)
*G08G 1/00* (2006.01)

(52) U.S. Cl.
CPC ............... *B60L 58/13* (2019.02); *B60L 1/00* (2013.01); *B60L 2240/60* (2013.01); *B60L 2240/70* (2013.01); *G08G 1/20* (2013.01)

(58) Field of Classification Search
CPC ........ B60L 58/13; B60L 1/00; B60L 2240/60; B60L 2240/70; G08G 1/20
USPC .......................................................... 701/22
See application file for complete search history.

(56) References Cited

U.S. PATENT DOCUMENTS

| | | | | |
|---|---|---|---|---|
| 2013/0020993 | A1* | 1/2013 | Taddeo | B60L 53/65 320/109 |
| 2013/0043838 | A1* | 2/2013 | Tsuchiya | H02J 5/00 320/109 |
| 2013/0249276 | A1* | 9/2013 | Rovik | B60L 3/12 307/9.1 |
| 2013/0342310 | A1* | 12/2013 | Park | B60L 53/80 701/1 |
| 2019/0308510 | A1* | 10/2019 | Beaurepaire | B60K 35/60 |
| 2021/0231740 | A1* | 7/2021 | Dubuque | G01R 31/382 |

* cited by examiner

*Primary Examiner* — Mahmoud S Ismail
(74) *Attorney, Agent, or Firm* — Foley & Lardner LLP

(57) ABSTRACT

Various disclosed embodiments include illustrative control units, systems, and vehicles. In an illustrative embodiment, a control unit includes a processor and computer-readable media that stores computer-executable instructions configured to cause the processor to determine a reserve level for a battery of an electric vehicle, determine activation status of electrical equipment in the electric vehicle responsive the reserve level and a battery level, and control supply of power from the battery to the electrical equipment responsive to the activation status.

15 Claims, 7 Drawing Sheets

CONTROL UNITS, SYSTEMS, AND VEHICLES FOR CONTROLLING OPERATIONS OF ON-BOARD EQUIPMENT

INTRODUCTION

The present disclosure relates to controlling activation of electrical equipment of a vehicle. The statements in this section merely provide background information related to the present disclosure and may not constitute prior art.

The battery of a vehicle may be used to electrically power electrical equipment located in the vehicle. However, the electrical equipment or other electrical loads could drain the connected vehicle's battery. A drained battery would limit the ability to drive the vehicle to a destination or to a charging device.

BRIEF SUMMARY

Various disclosed embodiments include illustrative control units, systems, and vehicles.

In an illustrative embodiment, a control unit includes a processor and computer-readable media that stores computer-executable instructions configured to cause the processor to determine a reserve level for a battery of an electric vehicle, determine activation status of electrical equipment in the electric vehicle responsive the reserve level and a battery level, and control supply of power from the battery to the electrical equipment responsive to the activation status.

In another illustrative embodiment, a system includes a battery and a control unit. The control unit includes a processor and computer-readable media configured to store computer-executable instructions configured to cause the processor to determine a reserve level for the battery, determine activation status of the electrical equipment responsive the reserve level and a battery level, and control supply of power from the battery to the electrical equipment responsive to the activation status.

In another illustrative embodiment, a vehicle includes tire changing equipment, a battery, an alternating current power distribution device, and a control unit. The control unit includes a processor and computer-readable media configured to store computer-executable instructions configured to cause the processor to determine a reserve level for the battery, determine activation status of the tire changing equipment responsive the reserve level and a battery level, and control supply of power from the battery to the electrical equipment responsive to the activation status.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
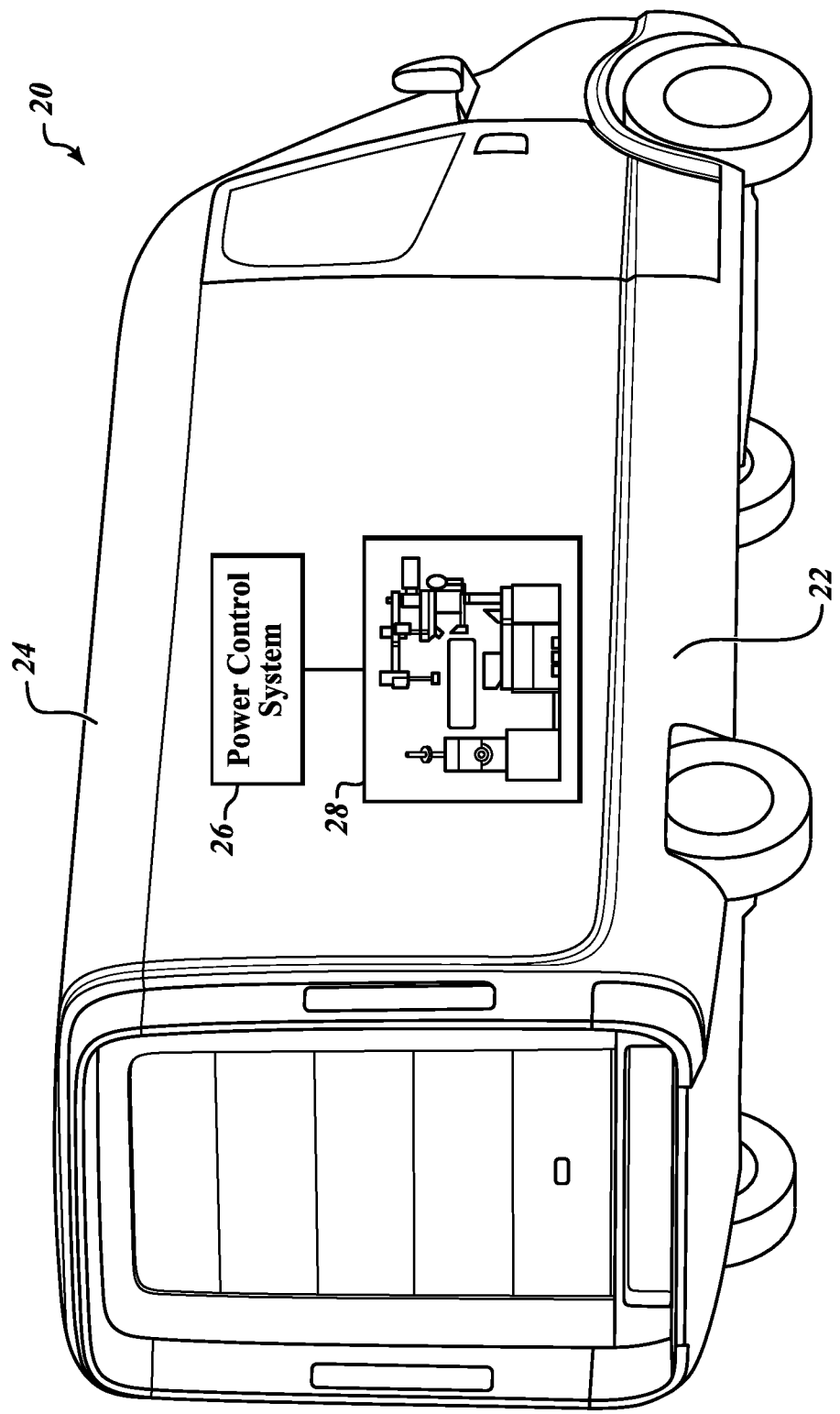
FIG. 1 is a schematic diagram of an illustrative vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative control units, systems, and vehicles. As will be explained below, such embodiments can control alternating current (AC) power distribution to on-board AC (electrical) equipment, such as without limitation tire changing/balancing equipment.

Figure 2:
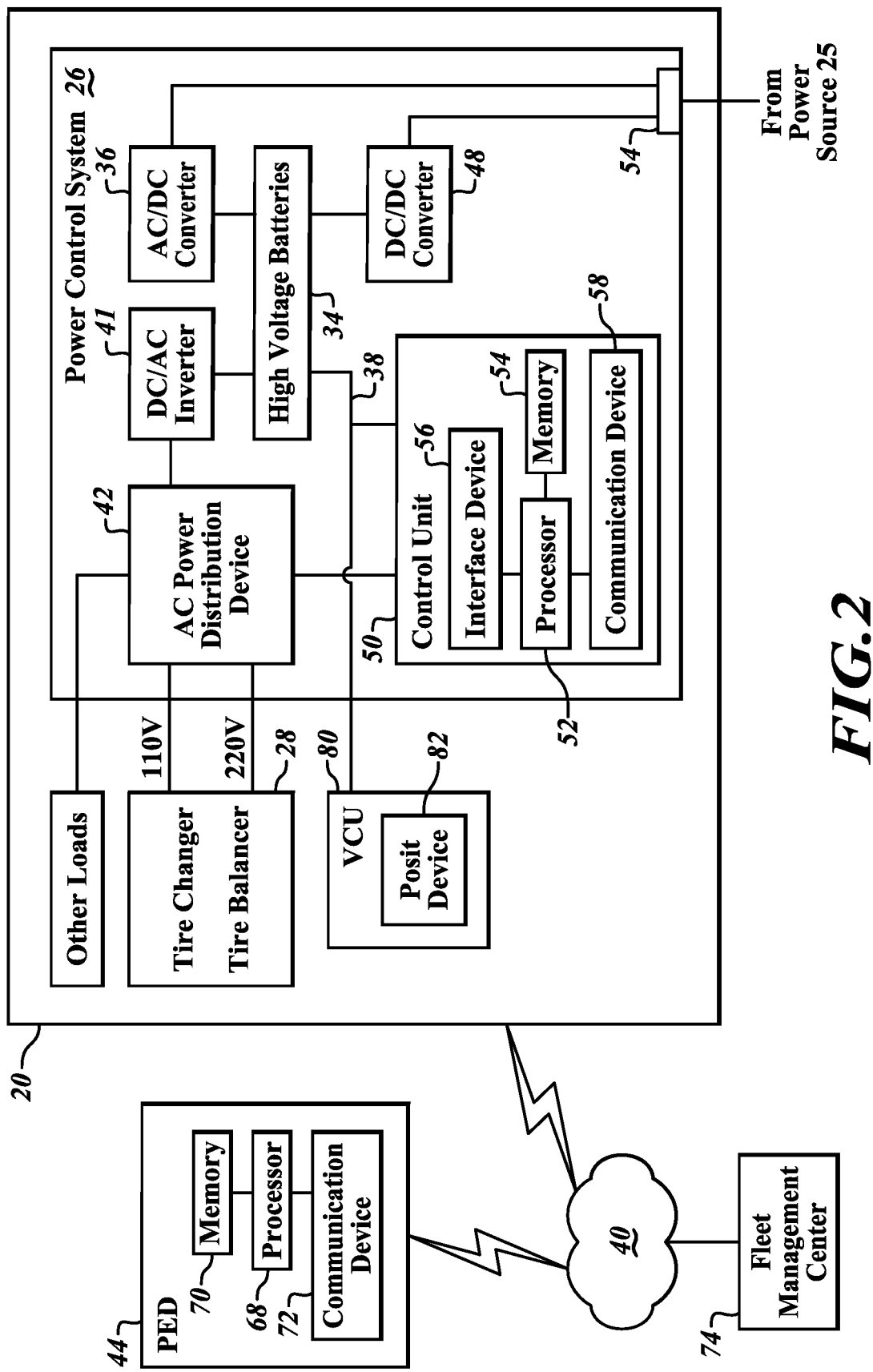
FIG. 2 is a block diagram of illustrative components of the vehicle of FIG. 1.
Figure 3:
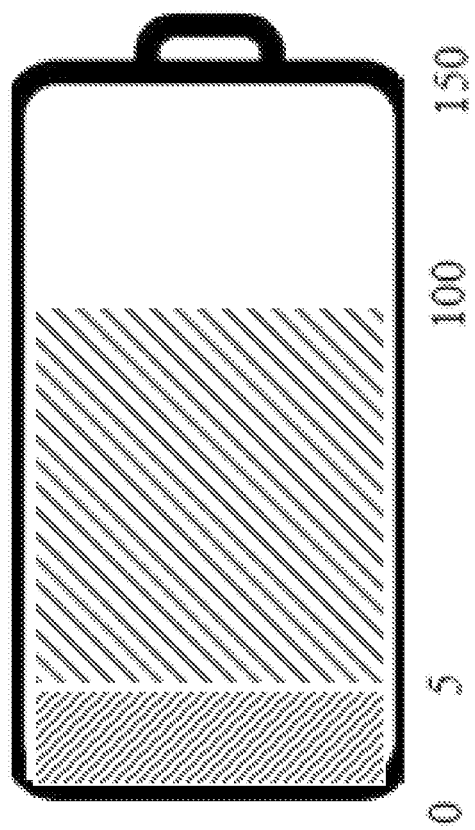
FIG. 3 is a schematic diagram of an illustrative battery used in the vehicle of FIG. 1.

Given by way of non-limiting overview and referring to FIGS. 1-3, in various embodiments, a power control system 26 controls power distribution from a battery 34 for a vehicle 20 for allowing usage of on-board AC equipment, including, but not limited to, tire changing and balancing equipment 28. The power control system 26 includes a control unit 50 having a processor 52 and non-transitory computer-readable media, such as memory 54, configured to store computer-executable instructions. The instructions are configured to cause the processor 52 to determine activation status for various on-board equipment. The activation status is chosen to provide sufficient electrical power to enable the vehicle 20 to achieve one or more functions, such as tire changing functions, associated with the on-board equipment. It should be noted the processor 52 may determine activation status based on one or more reserve levels for the battery 34, possibly configurable by a user or determined by a remote management system. For example, a reserve level for the battery 34 may enable the vehicle 20 to drive 25 miles to a first target location. In another example, the reserve level for the battery 34 may enable the vehicle 20 to the first target location, perform an action(s) using the on-board electrical equipment, then drive to a second target location. For example, if the on-board electrical equipment includes a tire changer or tire balancer, the performed actions would be tire changing and tire balancing, respectively.

Now that an overview has been presented by way of illustration only and not of limitation, details will be set forth by way of non-limiting examples given by way of illustration only and not of limitation. First, the illustrative power control system 26 will be explained by way of non-limiting examples given by way of illustration only. Then, illustrative processes for controlling activation status responsive to determining a reserve level for a battery will be explained by way of non-limiting examples given by way of illustration only.

As shown in FIGS. 1-3, in various embodiments, the illustrative vehicle 20 is configured to include the power control system 26 for controlling activation status for various electrical equipment responsive to current battery information and a determination of a reserve level for the battery 34. The power control system 26 may include the battery 34, the control unit 50, a direct current (DC)/AC converter 41, an AC power distribution device 42, and one or both of an AC/DC converter 36 or a DC/DC converter 48. The control unit 50 includes a processor 52, a non-transitory computer readable media (memory 54), an interface device 56, and a communication device 58. The control unit 50 may be in data communication with a personal electronics device (PED) 44 a fleet management center 74 located remotely from the vehicle 20 via a wired or wireless connection with the communication device 58. The control unit 50 may also be in data communication with the battery 34 and the AC power distribution device 42 via a data bus 38.

In various embodiments, the battery 34 may connect to an AC supply 25 that provides AC or DC electrical power from a variety of different devices, such as wind turbine, solar cell, geothermal, nuclear power plants, hydro-electric power plants, natural gas power plants, coal-run power plants, a DC charger or any mechanism that can produce AC or DC electrical power.

Given by way of non-limiting example, in various embodiments, the vehicle 20 may be an electric vehicle (that is, an all-electrically driven vehicle) or a hybrid vehicle. For example and given by way of non-limiting examples, in various embodiments, the vehicle may include a motor vehicle driven by wheels and/or tracks, such as, without limitation, an automobile, a truck, a sport utility vehicle (SUV), a cargo van, and the like. Given by way of further non-limiting examples, in various embodiments, the vehicle 20 may include a marine vessel such as, without limitation, a boat, a ship, a submarine, a submersible, an autonomous underwater vehicle (AUV), and the like. Given by way of further non-limiting examples, in various embodiments, the vehicle 20 may include an aircraft such as, without limitation, a fixed wing aircraft, a rotary wing aircraft, and a lighter-than-air (LTA) craft.

In various embodiments and given by way of example only and not of limitation, the battery 34 suitably includes high energy rechargeable batteries that store electrical charge, discharge electrical current upon request, and recharge. The rechargeable batteries may be structured in any desirable form, such as without limitation cylindrical, pouch, prismatic, massless, or other comparable forms. In various embodiments, the rechargeable batteries may include Iron-air batteries, Li-ion batteries, such as without limitation Nickel Cobalt Aluminium, Lithium Manganese Cobalt, or Lithium Manganese Oxide batteries. However, other materials may be used that provide comparable recharging, energy density, and energy discharge capabilities.

As shown in FIG. 2, in various embodiments, the memory 54 stores computer-executable instructions configured to cause the processor 52 to perform various power distribution control functions such as, without limitation, collecting and analyzing battery information, determining schedule information, and controlling distribution of AC power responsive to the battery information and the schedule information. In various embodiments, the instructions are further configured to cause the processor to enable the battery to supply power to the electrical equipment in the device responsive to a battery level being greater than a battery reserve level and disable the battery from supplying the power to the electrical equipment responsive to the battery level meeting or falling below the battery reserve level. The battery reserve level may correspond to an amount of miles the vehicle 20 can travel based on the reserve level. For example, referring to FIG. 3, a bottom level of the reserve level may be associated with a base value of miles, such as, without limitation, 5 miles. Adjustments to the reserve level due to other factors, such as, without limitation, scheduled events, are used to allow operators to perform actions with the electrical equipment up to a limit as defined by the adjusted reserve level. In the illustrative example, the actual battery level equates to 100 miles of travel or about 66% of a battery that can supply at full charge 150 miles of travel.

In various embodiments, the communication device 58 may send the battery information to a power electronics device (PED) 44 or the fleet management center 74 directly or via a network 40. The PED 44 or the fleet management center 74 may generate power distribution control information responsive to the battery information, and previously stored schedule information. The power distribution control information produced by the PED 44 or the fleet management center 74 may be sent back to the control unit 50 via the same connection for use in controlling distribution of AC power via the AC power distribution device 42.

In various embodiments, the illustrative vehicle 20 may include a vehicle control unit (VCU) 80. In various embodiments, the VCU 80 provides information to the control unit 50 regarding location of the vehicle 20. In various embodiments, the VCU 80 may include a positioning device 82, such as a global positioning system (GPS), a global navigation satellite system (GNSS), or the like. Positioning devices are well known in the art and no further explanation is necessary for a person of skill in the art to understand the disclosed subject matter.

In various embodiments, the control unit 50 may communicate with the VCU 80, the AC power distribution device 42, and other vehicle components via the data bus 38, such as a network bus, like a peer-to-peer network bus such as a controller area network (CAN) bus. Other network buses, such as a local area network (LAN), a wide area network (WAN), or a value-added network (VAN), may also be used for enabling communication between the components.

In various embodiments, the PED 44 may provide operational information to a user regarding the battery 34, a determined batter reserve level, and/or activation status for the electrical equipment attached to the AC power distribution device 42. The PED 44 may be a smartphone, tablet, smartwatch, or any device capable of providing information to a user. In various embodiments, the PED 44 may include a second processor 68, a non-transitory computer readable media (second memory 70), and a second communication device 72. The PED 44 may include application programs configured to determine and send battery reserve level information to the processor 52 via the communication devices 58 and 72.

In various embodiments, the fleet management center 74 provides schedule information associated with the vehicle 20 and/or an operator of the vehicle 20. The schedule information may include time, location, and action-to-be performed for calendared events. For example, the schedule information includes information identifying the location of the next customer (next location) identified in a servicing schedule stored at the fleet management center 74. The schedule information may also include a quantity and type of an action scheduled to be performed for the next customer. For example, the scheduled action quantity and type may include performing three tire changes with tire balancing. The calendared events may include calendared activity information that includes an amount and type of function and a location of a next customer. The function may be a tire changing function, any function performed using a compressor, such as, without limitation, a hydraulic suspension servicing function, a coolant servicing function, or a brake hydraulic servicing function. The function may also include a function for charging a battery of battery powered devices, such as, without limitation, computers, battery powered tools, or another electric vehicle.

In various embodiments, the processing described herein for identifying a reserve level for the battery 34 may be performed at or distributed between any of the processing locations, such as, without limitation, the processors 52 and 68 and the fleet management center 74. As discussed herein, in various embodiments, the processors 52 and 68 and the fleet management center 74 suitably may include computer processors, data processors, or the like, that are configured to execute instructions received from external sources or stored in local memory 54 and 70.

As discussed herein, in various embodiments, the memory 54 and 70 includes non-transitory computer-readable storage medium that include computer-readable code (instructions) stored thereon for causing the respective processors 52 and 68 to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like.

When stored in the non-transitory computer-readable medium, software can include the instructions executable by the respective processors 52 and 68 that, in response to such execution, causes performance of a set of operations, steps, methods, processes, algorithms, functions, techniques, etc. as described herein for the various embodiments.

In various embodiments, the communication devices 58 and 72 may include any suitable wired or wireless device (such as a transceiver or the like) configured to communicate with the other communication devices using various network access devices, methods, and/or protocols, such as, without limitation, a wireless (WiFi, Bluetooth) connection with a network portal/modem/router, a wired or wireless connection, or the like.

Now that the power control system 26 has been described, illustrative processes for controlling AC power distribution to on-board electrical equipment responsive to a determined reserve power limit for a battery will be explained by way of non-limiting examples given by way of illustration only.

In various embodiments, the control unit 50 is used to dynamically establish and/or adjust a reserve battery level responsive to a review of schedule information, thus providing the vehicle 20 has reserve power for travelling to a target destination (customer) and perform an action(s)/service(s) at the target destination. The reserve power may also take into consideration amount of power needed to return to final destination (e.g., home) after the target destination. In various embodiments, the instructions are further configured to cause the processor 52 or 68 to receive the schedule information for the vehicle 20 from the fleet management center 74, the first memory 54, or the second memory 70 of the PED 44. Then, the instructions cause the processor 52 to determine the battery reserve level responsive to the schedule information and position information received from the VCU 80. The instructions cause the processor 52 to receive batter information, such as, without limitation, SOC, and determine activation status for the tire changing and balancing equipment 28 and/or other electrical equipment, such as, without limitation, tire changing equipment, or other loads, such as, without limitation, heating, ventilation, and air conditioning (HVAC) system, responsive to the battery information and the reserve level. The activation status is communicated to the AC power distribution device 42.

In various embodiments, the AC power distribution device 42 may include smart switches, such as, without limitation, smart circuit breakers. The AC power distribution device 42 activates or deactivates the smart switches responsive to the receive activation status. Smart switches are well known in the art and no further explanation is necessary for a person of skill in the art to understand the disclosed subject matter.

In various embodiments, the AC power distribution device 42 may also switch the various electrical equipment/loads on or off based on any of nearing thermal limits of the in-use on-board equipment, low SOC of the battery 34, or estimated remaining drive distance pulled from daily appointment plan information included in the schedule information. The park, reverse, neutral, drive, low (PRNDL) state of the vehicle is considered so that operation of the inverter 41 or AC power distribution device 42 is locked out or deactivated when the vehicle is in a drive state. This removes any chance of certain loads interfering with other the vehicle systems during driving operations. Also, if the inverter 41 or AC power distribution device 42 are enabled but not being utilized for a significant amount of time, it is assumed to have been left in an on state and can be shut down. The PED 44 may be located with a technician and if the PED 44 is not within a predefined range of the equipment 28 as determined by the processor 52 analyzing signal information from the PED 44, the processor 52 can instruct the AC power distribution device 42 to shut down the equipment 28 in order to conserve energy.

In various embodiments, the equipment 28 is disabled when the battery 34 is in a high state of charge (SOC) due an overvoltage condition.

In various embodiments, in the case where battery SOC is too low, power from the power source 25 is used to either drive the inverter 41 depending upon the amount of charging power received.

In various embodiments, a technician using the interface device 56 may override any automatic cutoffs, such as, without limitation, the low SOC limitation, in order to be able to complete a project if needed. For example, the technician may change the activation status from deactivated to activated, if they believe the action/function needs to be performed despite the processor 52 indicating otherwise.

Other variables may be taken into account when determining controlling power to equipment, such as, without limitation, current/power drawn by line (for the sake of power balancing), state of HVAC system or other high-power items. Also, disabling power to individual devices may be performed based on priority or other factors. For example, different power consumers may be turned off as the battery charge (SOC) lowers based on how necessary those power consumers are to complete a scheduled task at hand, task currently being performed, or the like.

In various embodiments, the control unit 50 may also present various information to a user of the activation status of the on-board equipment via the interface device 56.

In various embodiments, capacity or state of charge (SOC) of the battery 34 is received at the processor 52 via the data bus 38. The processor 52 communicates the battery capacity or SOC information to the fleet management center 74 via the network 40 and the communication device 58. The fleet management center 74 may also receive the position information from the VCU 80 via the network 40 and the communication device 58. The fleet management center 74 may include an application program configured to cause a processor to determine the reserve level responsive to the received information, determine activation status for electrical equipment/loads of the vehicle 20 responsive to the reserve level and battery information, and communicate the activation status back to the vehicle 20.

In various embodiments, the fleet management center 74 may also receive/determine weather information from a weather source, determine the reserve level responsive to the weather information, and determine activation status of the electrical equipment/loads responsive to the weather-related reserve level. For example, the weather information may indicate weather and/or temperature that might require more battery power to get to a target location than driving to the same target location on a clear weather day.

In various embodiments, the schedule information may include calendared activity information associated with a user(s) of the vehicle 20. The calendared activity information may be included in a calendar application program accessible by the control unit 50, the VCU 80, the PED 44, and/or the fleet management center 74. The instructions are further configured to cause the processor 52 to establish the reserve level further responsive to the calendared activity information. In a nonlimiting example, the calendared activity information may indicate the location of a next appointment/customer and what tasks/actions/functions are to be performed at the next appointment.

The memory 54 or 70 and/or the fleet management center 74 stores amount of power/energy information associated with various tasks/actions/functions associated with the use of the on-board equipment. For example, each function, such as, without limitation, changing a tire, balancing a tire, inflating a tire, or the like, would have a different amount of energy value associated with it due to how much energy the associated on-board equipment uses to perform the function.

Figure 4:
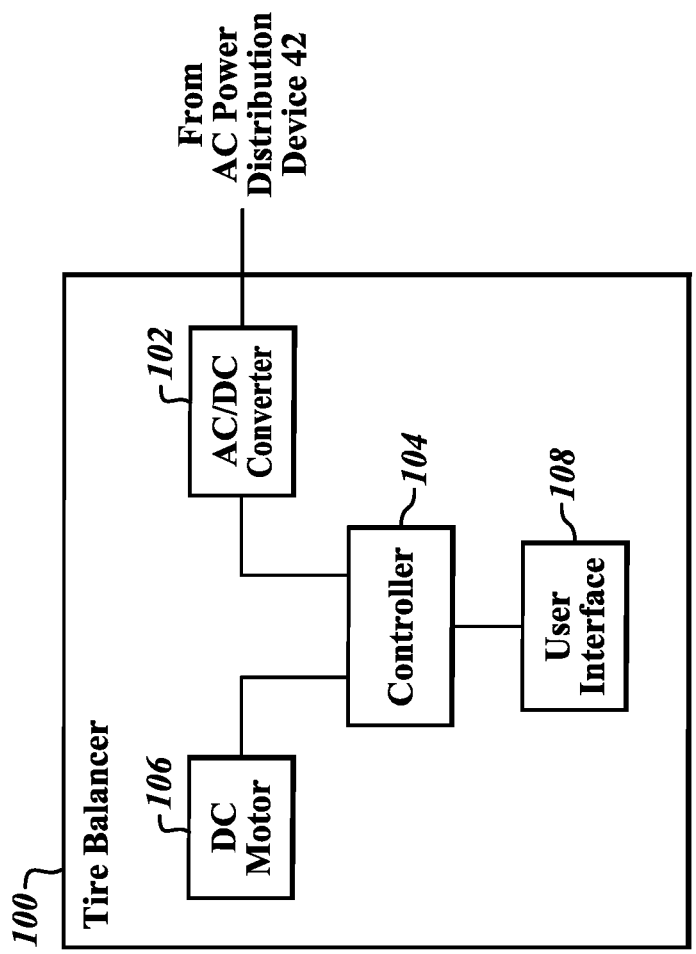
FIG. 4 is a block diagram of components of a tire balancer used in the vehicle of FIGS. 1 and 2.

Referring additionally to FIG. 4, in various embodiments, the tire changing and balancing equipment 28 includes a tire balancer 100 that includes an AC/DC converter 102, a controller 104, a DC motor 106, and a user interface 108. The AC/DC converter 102 receives AC power from the AC power distribution device 42 and coverts the received AC power to DC. The user interface 108 includes switches or control devices that allow a user to control delivery of DC from the AC/DC converter 102 to the DC motor 106 via the controller 104. The controller 104 may be preprogrammed to provide a soft start DC current to the DC motor 106.

Figure 5:
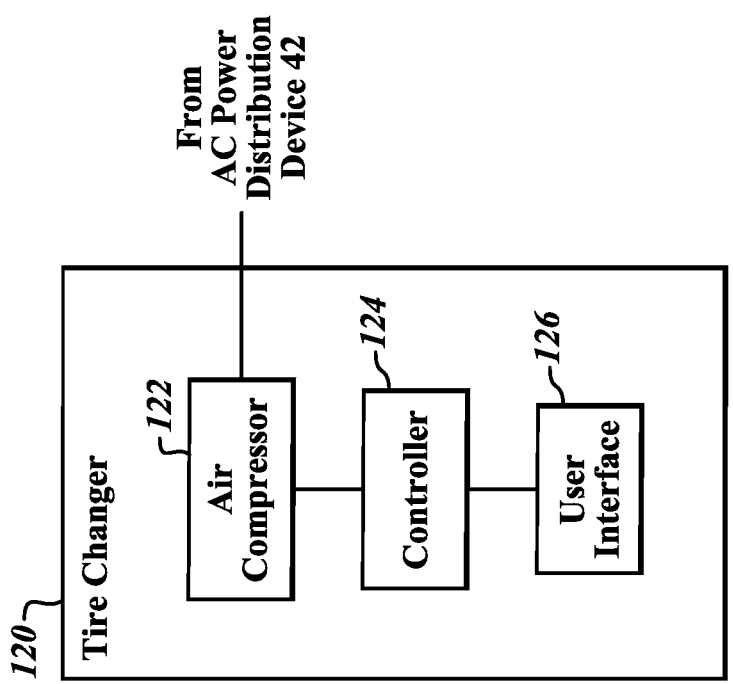
FIG. 5 is a block diagram of components of a tire changer used in the vehicle of FIGS. 1 and 2.

Referring additionally to FIG. 5, in various embodiments, the tire changing and balancing equipment 28 includes a tire changer 120 that includes an air compressor 122, a controller 124, and a user interface 126. The air compressor 122 is powered by AC from the AC power distribution device 42 as directed by the controller 124. The controller 124 activates the air compressor 122 responsive to user input received from the user interface 126.

Figure 6:
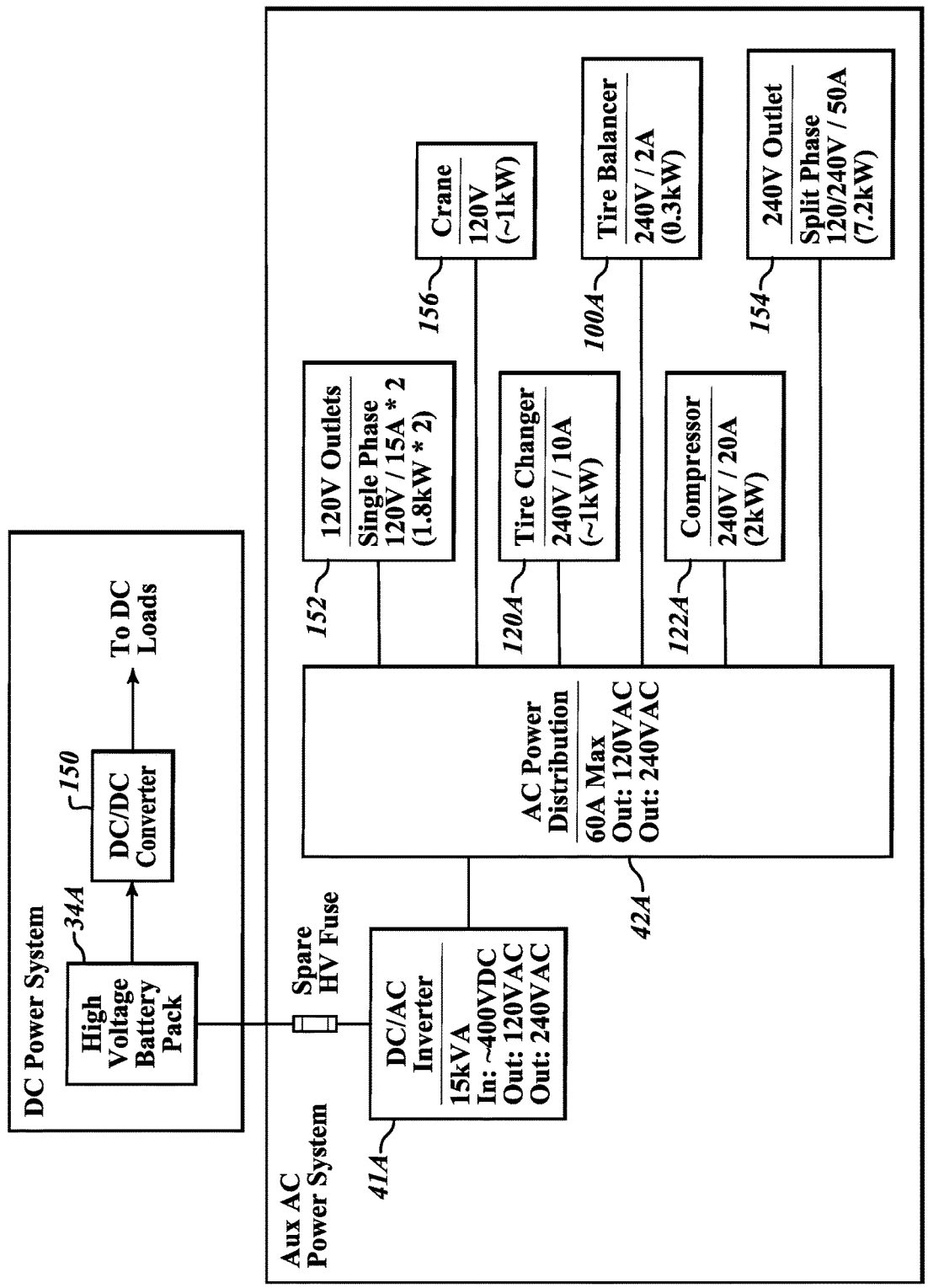
FIG. 6 illustrates a block diagram of components of a direct current (DC) and alternating current (AC) power system for a vehicle.

As shown in FIG. 6, a non-limiting example given by way of illustration only and not of limitation includes a high-voltage battery pack 34A that is included in a DC power system and an auxiliary AC power system. Within the DC power system, a DC/DC converter 90 converts DC power from the high-voltage battery pack 34A to a DC power value for delivery to DC loads. Within the auxiliary AC power system, a DC/AC inverter 41A receives DC power (~400 VDC) from the high-voltage battery pack 34A and converts the received DC power to multiple output AC buses, for example 120 VAC bus and a 240 VAC bus. A 60 amp (A) AC power distribution device 42A receives the output from the DC/AC inverter 41A and controls distribution to various output devices. The various output devices or electrical equipment may include multiple single phase 120V/15A*2 (1.8 kilowatt (kW)*2) outlets 152, a 120V (~1 kW) crane 156 (not part of the tire changing and balancing equipment 28, a 240V/10A (~1 kW) tire changer 120A, a 240V/2A (0.3 kW) tire balancer 100A, a 240V/20A (2 kW) compressor 122A, and multiple split phase 120/240V/50A (7.2 kW) outlets 154. The AC power distribution device 42A may be controlled by a control unit (not shown).

Figure 7:
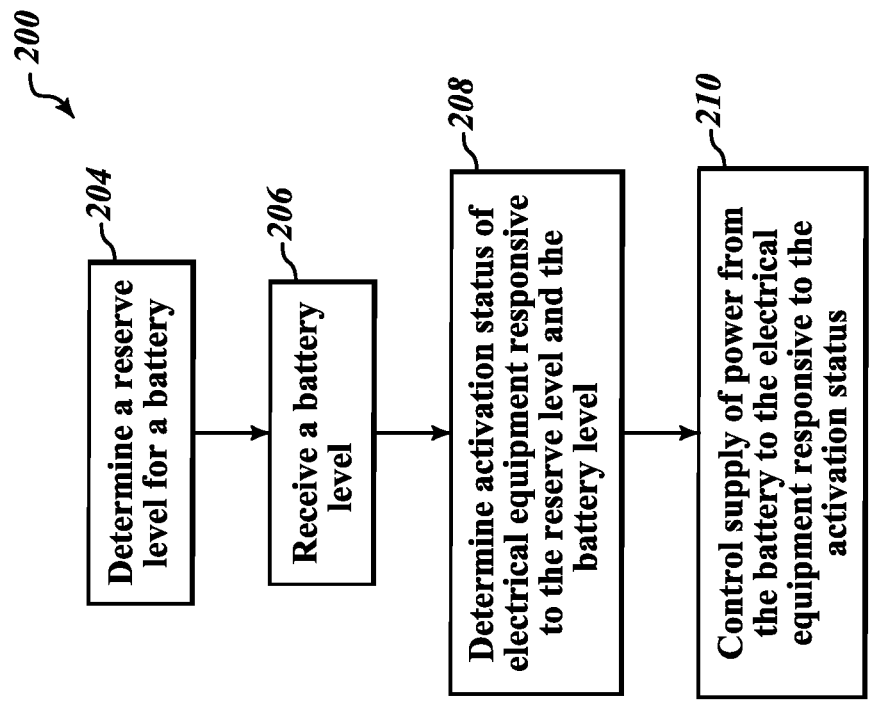
FIG. 7 is a flow diagram of an illustrative method performed for controlling power distribution to electrical equipment in a vehicle.

Referring additionally to FIG. 7, in various embodiments, an illustrative process 200 is provided for by a control unit executing instructions stored in a memory. At a block 204, a reserve level for a battery of a first device is determined. At a block 206, a battery level is received at the control unit. At a block 208, the control unit determines activation status of one or more pieces of electrical equipment responsive to the reserve level for the battery and the battery level. At a block 210, the control unit controls supply of power from the battery to the electrical equipment responsive to the activation status.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves.

Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A control unit comprising:
a processor; and
a non-transitory computer-readable media configured to store computer-executable instructions configured to cause the processor to:
  determine a reserve level for a battery of an electric vehicle, the battery to provide power to a direct current (DC) power system and to an alternating current (AC) power system via a DC/AC converter;
  determine activation status of electrical equipment in the electric vehicle responsive the reserve level and a battery level of the electric vehicle, the electrical equipment powered by the alternating current (AC) power system;
  control supply of power from the battery to the electrical equipment responsive to the activation status;
  determine schedule information associated with the electric vehicle;
  determine the reserve level responsive to the schedule information;
  wherein the schedule information includes calendared activity information associated with the electric vehicle; and
  wherein the instructions are further configured to cause the processor to determine the reserve level further responsive to the calendared activity information.

2. The control unit of claim 1, wherein the instructions are further configured to cause the processor to:
enable the battery to supply power to the electrical equipment in the electric vehicle responsive to the battery level being greater than the reserve level; and
disable the battery from supplying the power to the electrical equipment responsive to the battery level from one of meeting the reserve level and falling below the reserve level.

3. The control unit of claim 1, wherein the instructions are further configured to cause the processor to:
determine an amount of power needed to get the electric vehicle to a next location responsive to schedule information; and
determine the reserve level further responsive to the determined amount of power, wherein the activation status is determined based on the reserve level determined responsive to the determined amount of power.

4. The control unit of claim 1, wherein the calendared activity information includes an amount and type of function and a location of a next customer, wherein the function is chosen from a tire changing function, a hydraulic suspension servicing function, a coolant servicing function, a brake hydraulic servicing function, and a charging function for charging battery powered devices chosen from a computer or a battery powered tool.

5. The control unit of claim 1, further comprising:
a communication device configured to receive the schedule information from a fleet management center via a network.

6. The control unit of claim 1, further comprising:
an interface device,
wherein the instructions are further configured to cause the processor to:
  output information associated with the determined activation status; and
  receive input from a user to manually control the activation status of at least a portion of the electrical equipment,
wherein the interface device is configured to present the outputted information.

7. A system comprising:
an alternating current (AC) power system configured to receive power from a direct current (DC) power system, and provide power to electrical equipment;
the DC power system including a battery; and
a control unit including:
  a processor; and
  a non-transitory computer-readable media configured to store computer-executable instructions configured to cause the processor to:
    determine a reserve level for the battery;
    determine activation status of the electrical equipment responsive the reserve level and a battery level;
    control supply of power from the battery to the electrical equipment responsive to the activation status;
wherein the system is included in an electric vehicle,
wherein the instructions are further configured to cause the processor to:

determine schedule information associated with the electric vehicle; and determine the reserve level responsive to the schedule information;

wherein the schedule information includes calendared activity information associated with the electric vehicle; and wherein the instructions are further configured to cause the processor to determine the reserve level further responsive to the calendared activity information.

8. The system of claim 7, wherein the instructions are further configured to cause the processor to:

enable the battery to supply power to the electrical equipment responsive to the battery level being greater than the reserve level; and disable the battery from supplying the power to the electrical equipment responsive to the battery level chosen from one of meeting the reserve level and falling below the reserve level.

9. The system of claim 7, wherein the instructions are further configured to cause the processor to:

determine an amount of power needed to get the electric vehicle to a next location responsive to schedule information; and determine the reserve level further responsive to the determined amount of power, wherein the activation status is determined based on the reserve level determined responsive to the determined amount of power.

10. The system of claim 7, wherein the calendared activity information includes an amount and type of function and a location of a next customer, wherein the function is chosen from a tire changing function, a hydraulic suspension servicing function, a coolant servicing function, a brake hydraulic servicing function, and a charging function for charging battery powered devices chosen from a computer and a battery powered tool.

11. The system of claim 7, further comprising:

a communication device configured to receive the schedule information from a fleet management center via a network.

12. The system of claim 7, further comprising:

an interface device, wherein the instructions are further configured to cause the processor to:

output information associated with the determined activation status; and receive input from a user to manually control the activation status of at least a portion of the electrical equipment, wherein the interface device is configured to present the outputted information.

13. A vehicle comprising:

tire changing equipment to receive power via an alternating current power distribution device coupled with a battery;

the battery;

the alternating current power distribution device; and a control unit including:

a processor; and a non-transitory computer-readable media configured to store computer-executable instructions configured to cause the processor to:

determine a reserve level for the battery;

determine activation status of the tire changing equipment responsive the reserve level and a battery level;

control supply of power from the battery to the tire changing equipment, via the alternating current power distribution device, responsive to the activation status;

determine schedule information associated with the vehicle;

determine the reserve level responsive to the schedule information;

wherein the schedule information includes calendared activity information associated with the vehicle; and wherein the instructions are further configured to cause the processor to determine the reserve level further responsive to the calendared activity information.

14. The vehicle of claim 13, wherein the instructions are further configured to cause the processor to:

determine an amount of power needed to get the vehicle to a next location responsive to schedule information; and determine the reserve level further responsive to the determined amount of power, wherein the activation status is determined based on the reserve level determined responsive to the determined amount of power.

15. The vehicle of claim 14, wherein:

wherein the calendared activity information includes an amount and type of function and a location of a next customer, wherein the function is chosen from a tire changing function, a hydraulic suspension servicing function, a coolant servicing function, a brake hydraulic servicing function, and a charging function for charging battery powered devices chosen from a computer or a battery powered tool.

* * * * *